United States Patent
Easter et al.

(10) Patent No.: US 11,727,240 B2
(45) Date of Patent: *Aug. 15, 2023

(54) SELF-DETACHING ANTI-THEFT DEVICE WITH ENERGY LIMIT

(71) Applicant: Sensormatic Electronics, LLC, Boca Raton, FL (US)

(72) Inventors: Ronald B. Easter, Parkland, FL (US); Manuel Soto, Lake Worth, FL (US); Mohammad Mohiuddin, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,486

(22) Filed: Oct. 21, 2021

(65) Prior Publication Data
US 2022/0044088 A1  Feb. 10, 2022

Related U.S. Application Data

(63) Continuation of application No. 16/784,666, filed on Feb. 7, 2020.

(60) Provisional application No. 62/902,676, filed on Sep. 19, 2019.

(51) Int. Cl.
H04N 5/44   (2011.01)
G06K 19/07  (2006.01)
H04B 5/02   (2006.01)

(52) U.S. Cl.
CPC ........... *G06K 19/0723* (2013.01); *H04B 5/02* (2013.01)

(58) Field of Classification Search
CPC ............................ G06K 19/0723; H04B 5/02
See application file for complete search history.

(56) References Cited

U.S. PATENT DOCUMENTS

| | | | | |
|---|---|---|---|---|
| 5,084,699 A | * | 1/1992 | DeMichele | G06K 7/10178 336/182 |
| 5,940,001 A | * | 8/1999 | Okayasu | G07C 9/00182 455/343.1 |
| 6,778,070 B1 | * | 8/2004 | Thomas | G06K 19/0723 340/10.5 |
| 2016/0156200 A1 | * | 6/2016 | Kim | H02J 50/20 307/104 |
| 2019/0027009 A1 | * | 1/2019 | Miettinen | G08B 13/1463 |

* cited by examiner

*Primary Examiner* — Munear T Akki
(74) *Attorney, Agent, or Firm* — ArentFox Schiff LLP

(57) ABSTRACT

Systems and methods for operating a security tag. The methods comprise: receiving a first wireless signal using a receive circuit of the security tag; inducing a voltage in the receive circuit of the security tag while the first wireless signal is being received; performing operations by a controller to selectively close a switch while the voltage is being induced in the circuit; causing a release of a mechanical component of the security tag by allowing energy to flow from the receive circuit to the mechanical component when the switch is closed; and performing operations by the controller to prevent damage to the mechanical component as a result of the security tag being a certain distance from an external device.

24 Claims, 12 Drawing Sheets

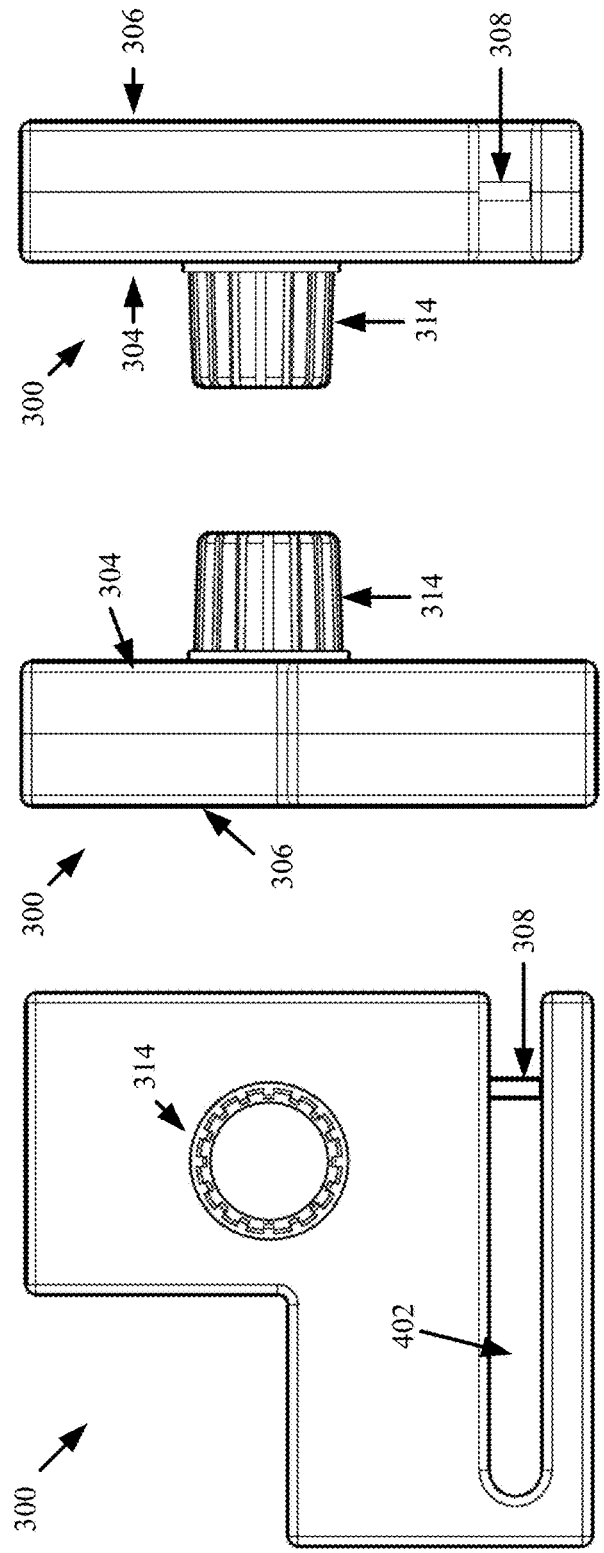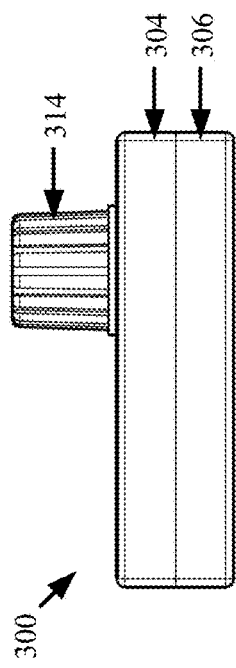
FIG. 5  FIG. 6  FIG. 7
FIG. 8

SELF-DETACHING ANTI-THEFT DEVICE WITH ENERGY LIMIT

CROSS-REFERENCE TO RELATED APPLICATIONS

The present application is a continuation application of, and claims priority to, pending U.S. patent application Ser. No. 16/784,666 filed on Feb. 7, 2020, which claims the benefit of Provisional Patent Application No. 62/902,676 filed on Sep. 19, 2019. The contents of each related application are hereby incorporated herein in its entirety.

FIELD

This document relates generally to anti-theft devices. More particularly, this document relates to security tags and methods for providing self-detaching anti-theft devices with energy limits.

BACKGROUND

A typical Electronic Article Surveillance ("EAS") system in a retail setting may comprise a monitoring system and at least one security tag or marker attached to an article to be protected from unauthorized removal. The monitoring system establishes a surveillance zone in which the presence of security tags and/or markers can be detected. The surveillance zone is usually established at an access point for the controlled area (e.g., adjacent to a retail store entrance and/or exit). If an article enters the surveillance zone with an active security tag and/or marker, then an alarm may be triggered to indicate possible unauthorized removal thereof from the controlled area. In contrast, if an article is authorized for removal from the controlled area, then the security tag and/or marker thereof can be detached therefrom. Consequently, the article can be carried through the surveillance zone without being detected by the monitoring system and/or without triggering the alarm.

Radio Frequency Identification ("RFID") systems may also be used in a retail setting for inventory management and related security applications. In an RFID system, a reader transmits a Radio Frequency ("RF") carrier signal to an RFID device. The RFID device responds to the carrier signal with a data signal encoded with information stored by the RFID device. Increasingly, passive RFID labels are used in combination with EAS labels in retail applications.

As is known in the art, security tags for security and/or inventory systems can be constructed in any number of configurations. The desired configuration of the security tag is often dictated by the nature of the article to be protected. For example, EAS and/or RFID labels may be enclosed in a rigid tag housing, which can be secured to the monitored object (e.g., a piece of clothing in a retail store). The rigid housing typically includes a removable pin which is inserted through the fabric and secured in place on the opposite side by a mechanism disposed within the rigid housing. The housing cannot be removed from the clothing without destroying the housing except by using a dedicated removal device.

A typical retail sales transaction occurs at a fixed Point Of Sale ("POS") station manned by a store sales associate. The store sales associate assists a customer with the checkout process by receiving payment for an item. If the item is associated with an EAS/RFID element, the store sales associate uses the dedicated removal device to remove the security tag from the purchased item.

A retail sales transaction can alternatively be performed using a mobile POS unit. Options for detaching a security tag using a mobile POS unit include: the use of a mobile detacher unit in addition to a mobile POS unit; the use of a fixed detacher unit located within the retail store which reduces the mobility of the mobile POS unit; or the use of a fixed detacher unit located at an exit of a retail store which burdens customers with a post-POS task. None of these options is satisfactory for large scale mobile POS adaption in a retail industry.

SUMMARY

The present document concerns systems and methods for operating a security tag. The methods comprise: receiving a first wireless signal transmitted from an external transmit circuit using a receive circuit of the security tag; inducing a voltage in the receive circuit of the security tag while the first wireless signal is being received; performing operations by a controller of the security tag to selectively close a switch while the voltage is being induced in the receive circuit; causing a release of a mechanical component of the security tag by allowing energy to flow from the receive circuit to the mechanical component when the switch is closed; and performing operations by the controller to prevent damage to the mechanical component as a result of the security tag being a certain distance from an external transmit circuit.

The damage to the mechanical component may be prevented by: monitoring a level of energy dissipation by the mechanical component; determining when an accumulated amount of energy dissipation by the mechanical component exceeds a threshold value; and interrupting the flow of energy from the receive circuit to the mechanical component when the accumulated amount of energy dissipation by the mechanical component exceeds a threshold value. The flow of energy is interrupted by opening the switch. The threshold value represents an upper safe operational limit of the mechanical component.

In some scenarios, the methods further comprise: selectively opening the switch upon expiration of a pre-defined period of time starting from a time at which the switch was closed; and/or selectively opening the switch when motion of the mechanical component is detected by the controller. The release of the mechanical component may be achieved by transitioning a pin from an engaged position to an unengaged position without any human assistance or mechanical assistance by a device external to the security tag.

In those or other scenarios, the voltage is induced in the receive circuit via resonant inductive coupling between the external transmit circuit and the inductor of the receive circuit. An inductor in the receive circuit resonates with a capacitor when the switch is closed. The capacitor is tuned to a frequency that is the same as a frequency to which the external transmit circuit is tuned.

In those or other scenarios, the mechanical component of the security tag is connected directly between the switch and a capacitor of the receive circuit. Additionally or alternatively, the methods also comprise: harvesting energy by the security tag when the switch is open; and/or discontinuing energy harvesting by the security tag when the switch is closed or when another event occurs (e.g., expiration of a given period of time or termination of the external transmit device's transmission of the wireless signal). In some scenarios, the energy harvesting continues even after the switch is closed.

DESCRIPTION OF THE DRAWINGS

The present solution will be described with reference to the following drawing figures, in which like numerals represent like items throughout the figures.

FIG. 5 is a top view of the security tag shown in FIGS. 3-4.

FIG. 6 is a right side view of the security tag shown in FIGS. 3-5.

FIG. 7 is a left side view of the security tag shown in FIGS. 3-6.

FIG. 8 is a bottom view of the security tag shown in FIGS. 3-7.

DETAILED DESCRIPTION

Figure 1:
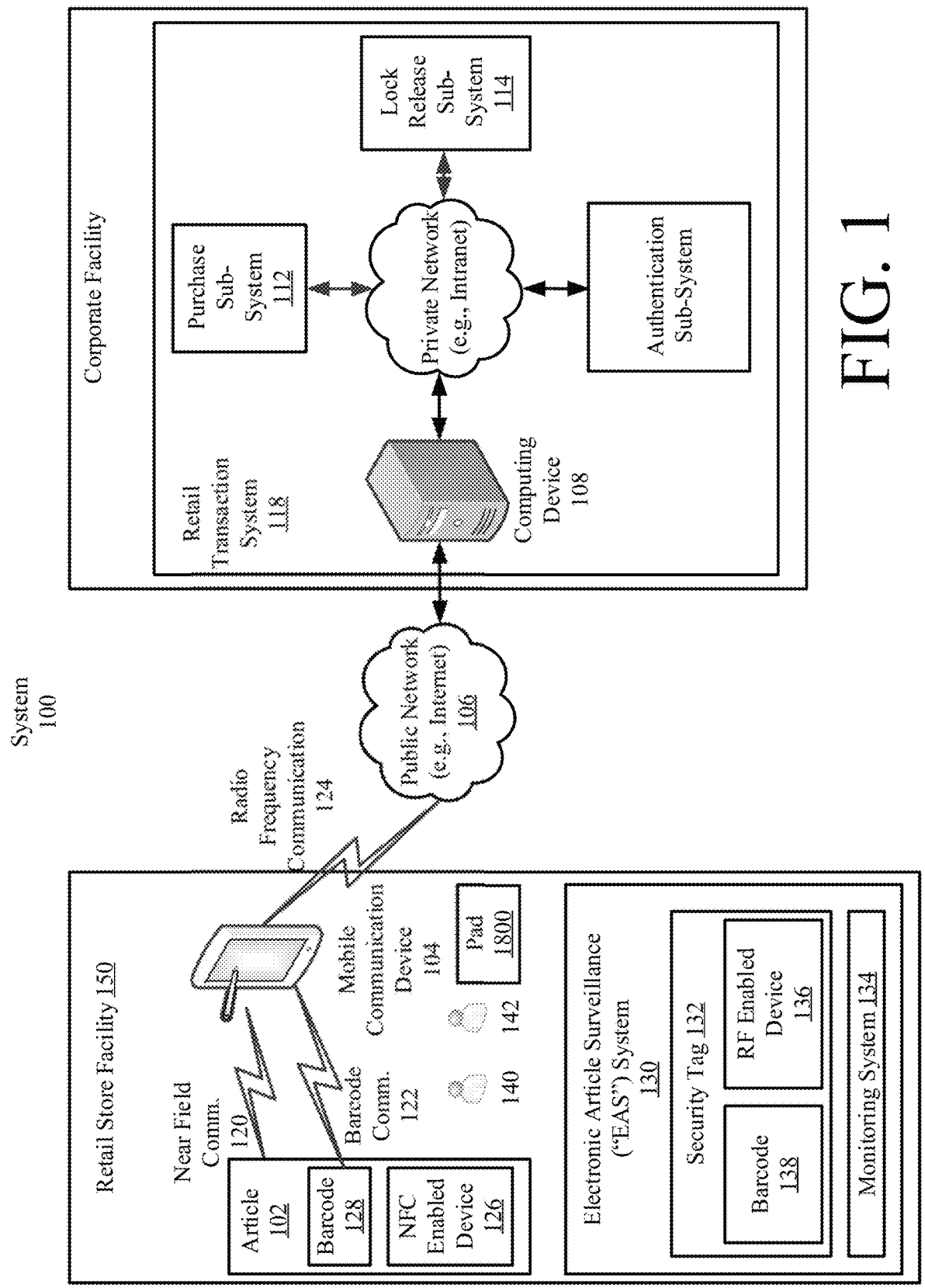
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

This disclosure deals broadly with anti-theft devices featuring Acousto-Magnetic ("AM") and/or RFID technology, advanced security tags equipped with visual and audible alarms, and audio/visual alarms incorporated into the AM/RFID pedestals at the stores' entrance/exit. In current retail practices generally employed, anti-theft devices (which are equipped with an RFID element, an AM element or both types of elements incorporated into hard tags) require customers to bring their merchandise to the POS at which time the cashier (a) completes the transaction and (b) deactivates and/or removes the anti-theft devices from the sold items. Customers can wait in lines for long periods of time before the next cashier is available. This solution can result in customer dissatisfaction, and thus could result in the loss of return business. Furthermore, sometimes cashiers forget to remove/deactivate anti-theft devices. This lapse leads to false alarms at the store's exit, customer embarrassment and wasted time.

Therefore, the present disclosure more specifically concerns a self-detaching solution for security tags. The self-detaching solution allows a customer to select a desired item (e.g., a piece of clothing), scan the desired item using an MPOS device (e.g., a smart phone and/or tablet running a purchase transaction software application), and make a secure payment of the desired item using a purchase transaction software application running on the MPOS device (e.g., using PayPal® or other cloud based online service). Once a purchase transaction has been verified by a retail store system, a wireless command signal is sent from the retail store system to the security tag. In response to the wireless command signal, one or both of the following events occurs: a mechanical component (e.g., a solenoid and/or a gear motor) is actuated so that removal of the security tag from the purchased item is possible by the customer. For example, actuation of the mechanical component causes a captive pin to be released, whereby the security tag can be removed from the item.

The present solution employs a novel solution for causing actuation of the security tag's mechanical component. The mechanical component needs a surge of electrical energy for actuation. The electronics control section of the security tag needs harvested energy for bias power. The essential elements involve a resonant RF transmitter at a counter surface and a resonant receive coil inside the security tag. The energy induced in the receive coil is used to both harvest enough energy to power the security tag's electronics as well as provide the power surge needed by the mechanical component.

Illustrative Systems for Detachment of Security Tags

Referring now to FIG. 1, there is provided an illustration of an illustrative system 100. System 100 comprises a Retail Store Facility ("RSF") 150 including an EAS system 130. The EAS system 130 comprises a monitoring system 134 and at least one security tag 132. Although not shown in FIG. 1, the security tag 132 is attached to article 102, thereby protecting the article 102 from an unauthorized removal from RSF 150. The monitoring system 134 establishes a surveillance zone (not shown) within which the presence of the security tag 132 can be detected. The surveillance zone is established at an access point (not shown) for RSF 150. If the security tag 132 is carried into the surveillance zone, then an alarm is triggered to indicate a possible unauthorized removal of article 102 from RSF 150.

During store hours, a customer 140 may desire to purchase the article 102. The customer 140 can purchase the article 102 without using a traditional fixed POS station (e.g., a checkout counter). Instead, the purchase transaction can be achieved using a Mobile Communication Device ("MCD") 104. MCD 104 (e.g., a mobile phone or tablet computer) can be in the possession of the customer 140 or store associate 142 at the time of the purchase transaction. Notably, MCD 104 has a retail transaction application installed thereon that is configured to facilitate the purchase of article 102 and an attachment/detachment of the security tag 132 to/from article 102. The retail transaction application can be a pre-installed application, an add-on application or a plug-in application.

In order to initiate a purchase transaction, the retail transaction application is launched via a user-software interaction. The retail transaction application facilitates the exchange of data between the article 102, security tag 132, customer 140, store associate 142, and/or Retail Transaction System ("RTS") 118. For example, after the retail transaction application is launched, a user 140, 142 is prompted to start a retail transaction process for purchasing the article 102. The retail transaction process can be started simply by performing a user software interaction, such as depressing a key on a keypad of the MCD 104 or touching a button on a touch screen display of the MCD 104.

Subsequently, the user 140, 142 may manually input into the retail transaction application article information. Alternatively or additionally, the user 140, 142 places the MCD 104 in proximity of article 102. As a result of this placement, the MCD 104 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the MCD 104 via a Short Range Communication ("SRC"), such as a barcode communication 122 or a Near Field Communication ("NFC") 120. In the barcode scenario, article 102 has a barcode 128 attached to an exposed surface thereof. In the NFC scenarios, article 102 may comprise an NFC enabled device 126.

Thereafter, payment information is input into the retail transaction application of MCD 104 by the user 140, 142. Upon obtaining the payment information, the MCD 104 automatically performs operations for establishing a retail transaction session with the RTS 118. The retail transaction session can involve: communicating the article information and payment information from MCD 104 to the RTS 118 via an RF communication 124 and public network 106 (e.g., the Internet); completing a purchase transaction by the RTS 118; and communicating a response message from the RTS 118 to MCD 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 118 using the article information and payment information. In this regard, such information may be received by a computing device 108 of the RTS 118 and forwarded thereby to a sub-system of a private network 100 (e.g., an Intranet). For example, the article information and purchase information can also be forwarded to and processed by a purchase sub-system 112 to complete a purchase transaction. When the purchase transaction is completed, a message is generated and sent to the MCD 104 indicating whether the article 102 has been successfully or unsuccessfully purchased.

If the article 102 has been successfully purchased, then a security tag detaching process can be started automatically by the RTS 118 or by the MCD 104. Alternatively, the user 140, 142 can start the security tag detaching process by performing a user-software interaction using the MCD 104. In all three scenarios, the article information can optionally be forwarded to and processed by a lock release sub-system 114 to retrieve a detachment key or a detachment code that is useful for detaching the security tag 132 from the article 102. The detachment key or code is then sent from the RTS 118 to the MCD 104 such that the MCD 104 can perform tag detachment operations. The tag detachment operations are generally configured to cause the security tag 132 to actuate a detaching mechanism (not shown in FIG. 1). In this regard, the MCD generates a detach command and sends a wireless detach signal including the detach command to the security tag 132. The security tag 132 authenticates the detach command and provides notification to the MCD that the detach command is authenticated. At this time, a pad or other transmit circuit is enabled or otherwise activated so that a signal is transmitted therefrom. This signal causes the activation of the security tag's detaching mechanism. For example, the signal causes the detachment mechanism to release a pin such that the security tag can be removed from the article 102. Once the security tag 132 has been removed from article 102, the customer 140 can carry the article 102 through the surveillance zone without setting off the alarm.

Figure 2:
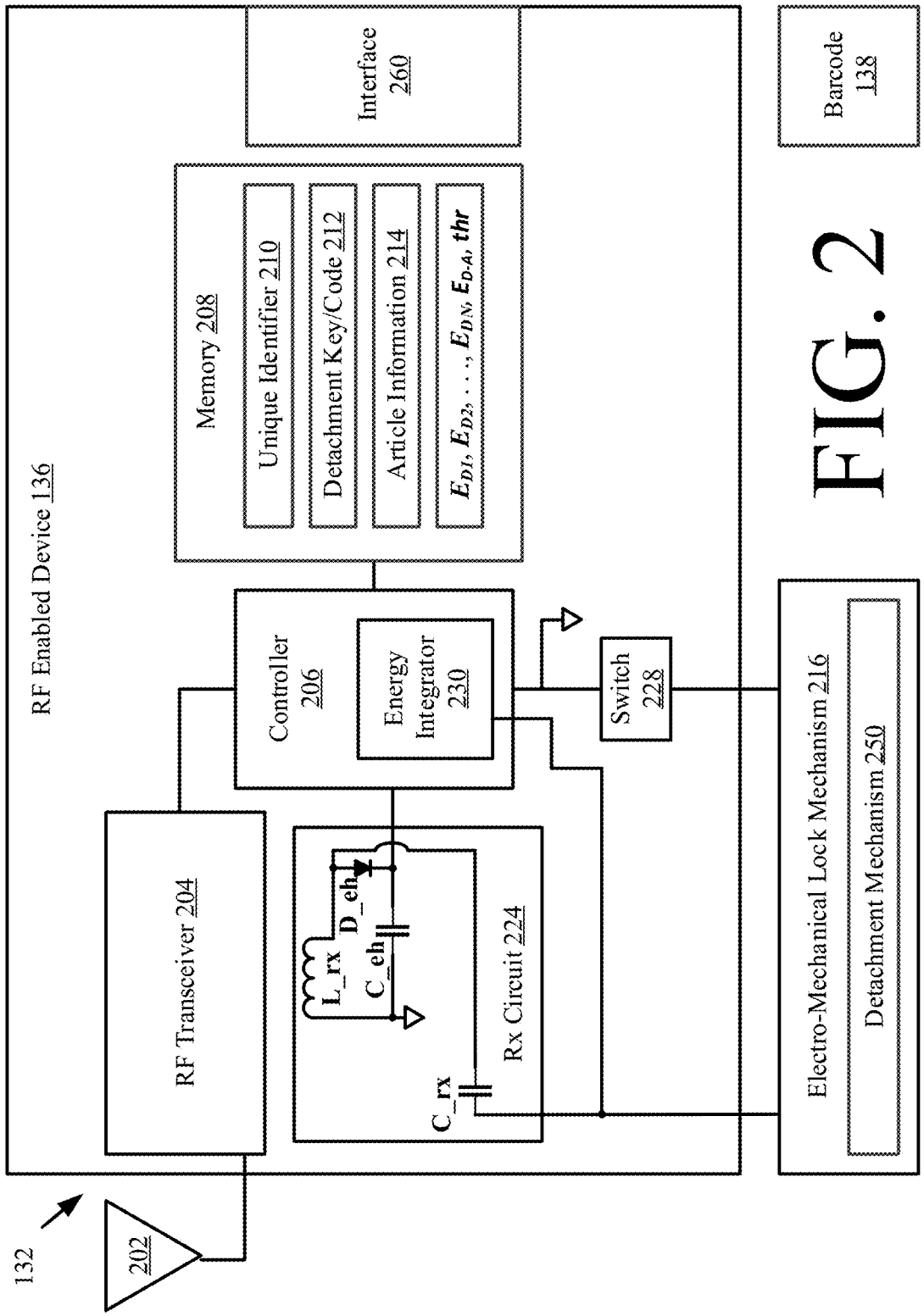
FIG. 2 is a block diagram of an illustrative architecture for a security tag shown in FIG. 1.
Figure 3:
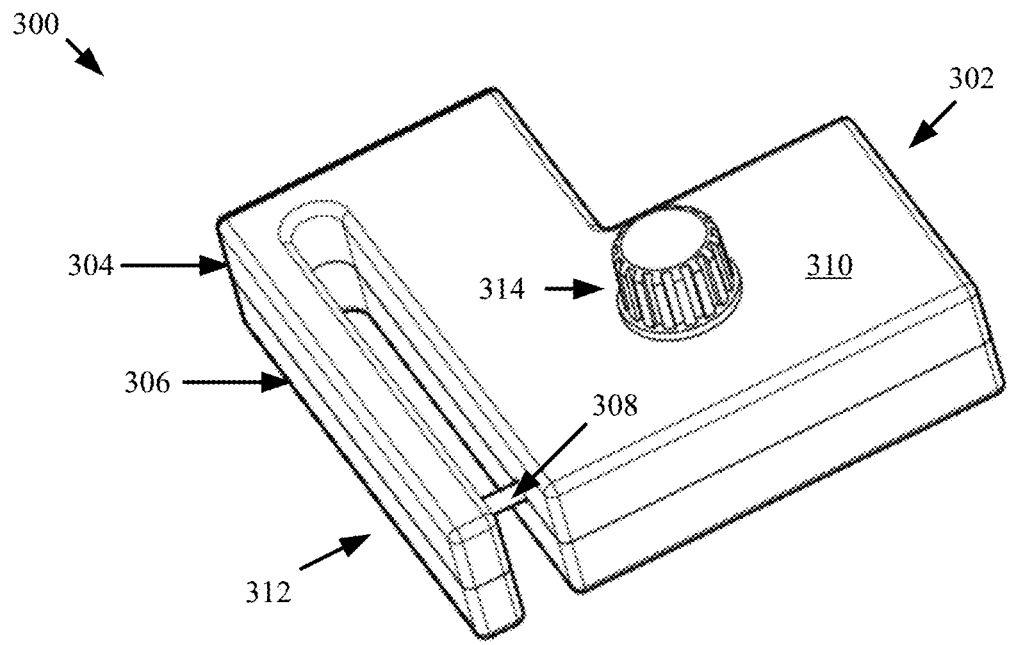
FIG. 3 is a front perspective view of an illustrative security tag.
Figure 4:
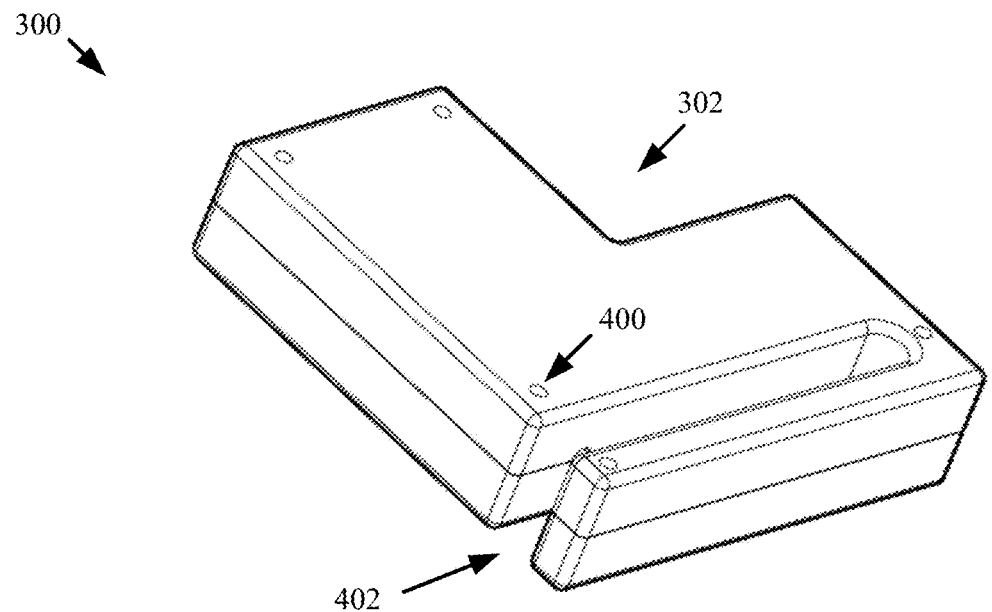
FIG. 4 is a back perspective view of the security tag shown in FIG. 3.

Referring now to FIG. 2, there is provided an illustration of an illustrative architecture for security tag 132. Security tag 132 can include more or less components than that shown in FIG. 2. However, the components shown are sufficient to disclose an illustrative embodiment implementing the present solution. Some or all of the components of the security tag 132 can be implemented in hardware, software and/or a combination of hardware and software. The hardware includes, but is not limited to, one or more electronic circuits.

The hardware architecture of FIG. 2 represents a representative security tag 132 configured to facilitate the prevention of an unauthorized removal of an article (e.g., article 102 of FIG. 1) from an RSF (e.g., RSF 150 of FIG. 1). In this regard, the security tag 132 may have a barcode 138 affixed thereto for allowing data to be exchanged with an external device (e.g., MCD 104 of FIG. 1) via barcode technology.

The security tag 132 also comprises an antenna 202 and an RF enabled device 136 for allowing data to be exchanged with the external device via RF technology. The antenna 202 is configured to receive RF signals from the external device and transmit RF signals generated by the RF enabled device 136. The RF enabled device 136 comprises an RF transceiver 204. RF transceivers are well known in the art, and therefore will not be described herein.

The RF enabled device 136 also comprises an Rx circuit 224. A signal transmitted from a pad or other transmit circuit 222 induces a voltage in a receive coil L_rx of the Rx circuit 224. This voltage charges an energy harvesting capacitor C_eh of the Rx circuit 224, when a switch 228 is open. The energy stored by the energy harvesting capacitor C_eh is used to power the controller 206. The energy harvesting may be discontinued by the security tag when the switch is closed or when another event occurs (e.g., expiration of a given period of time or termination of the external transmit device's transmission of the wireless signal). In some scenarios, the energy harvesting continues even after the switch is closed.

The controller 206 processes received RF signals to extract information therein. This information can include, but is not limited to, a request for certain information (e.g., a unique identifier 210), and/or a message including information specifying a detachment key or code for detaching the security tag 132 from an article.

If the extracted information includes a request for certain information, then the controller 206 may perform operations to retrieve a unique identifier 210 and/or article information 214 from memory 208. The article information 214 can include a unique identifier of an article and/or a purchase price of the article. The retrieved information is then sent from the security tag 132 to a requesting external device (e.g., MCD 104 of FIG. 1) via an RF communication facilitated by RF transceiver 204.

If the extracted information includes instructions for actuating a detachment mechanism 250 of an electro-mechanical lock mechanism 216, then the controller 206 may perform operations to selectively close the switch 228 (which is normally open). Switch 228 can include, but is not limited to, a transistor. When switch 228 is closed, energy is allowed to flow from the Rx circuit 224 to the detachment mechanism 250 of an electro-mechanical lock mechanism 216. In this regard, a receive coil L_rx of the Rx circuit 224 resonates with a receive capacitor C_rx (tuned to the same frequency as the Tx circuit 222) to provide energy to the electro-mechanical lock mechanism 216. At this time, actuation of the detachment mechanism 250 occurs. An auditory or visual indication can be output by the security tag 132 when the detachment mechanism 250 is actuated.

Alternatively or additionally, the controller 206 can: parse the information from a received message; retrieve a detachment key/code 212 from memory 208; and compare the parsed information to the detachment key/code to determine if a match exists therebetween. If a match exists, then the controller 206 closes switch 228 for actuating the detachment mechanism 250. An auditory or visual indication can be output by the security tag 132 when the detachment mechanism 250 is actuated. If a match does not exist, then the controller 206 may generate a response message indicating that detachment key/code specified in the extracted information does not match the detachment key/code 212 stored in memory 208. The response message may then be sent from the security tag 132 to a requesting external device (e.g., MCD 104 of FIG. 1) via a wireless short-range communication or a wired communication via interface 260. A message may also be communicated to another external device or network node via interface 260.

Notably, the detachment mechanism 250 may be damaged when the distance between the security tag 132 and a transmitting device (e.g., MCD 104 of FIG. 1 and/or pad 1800 of FIG. 18) is too close. At such close proximity, more energy than necessary is delivered to the electromechanical lock mechanism 216. An energy integrator 230 is provided with controller 206 to ensure that such damage to the electromechanical lock mechanism 216 does not occur when the security tag 132 is in relatively close proximity to the transmitting device.

The energy integrator 230 is configured to monitor relevant electrical parameters (e.g., current and/or voltage at an output terminal of the capacitor C_rx), and calculate the amount of energy that the electromechanical lock mechanism 216 is dissipating in real time. The amount of energy dissipation is computed in accordance with the following Mathematical Equations (1) and (2).

$$E_D = I \times V \times \Delta t \quad (1)$$

wherein $E_D$ represents an amount of energy dissipation, I represents current, V represents voltage, and $\Delta t$ represents an integration interval. $E_D$ is determined at a plurality of times $1, \ldots, N$, where N is an integer. The values for $E_{D1}, E_{D2}, \ldots E_{DN}$ are stored in memory 208 as shown in FIG. 2. Each time a new energy dissipation value is computed, an accumulated dissipated energy $E_{D-A}$ is also computed in accordance with the following Mathematical Equation (2).

$$E_{D-A} = E_{D1} + E_{D2} + \ldots + E_{DN} \quad (2)$$

The value of $E_{D-A}$ is then compared to a threshold value thr. If $E_{D-A}$ is greater than thr, then the integrator 230 causes an interruption of the supply of energy from the receive circuit 224 to the electromechanical lock mechanism 216. The threshold value thr represents an upper safe operational limit of the detachment mechanism 250. The supply of energy is interrupted by causing the controller 206 to selectively open the switch 228. The $E_D$ and $E_{D-A}$ values may be deleted or re-set to zero when the supply of energy is interrupted.

The controller 206 selectively opens the switch 228 when certain criteria is met. For example, the switch 228 is opened when a pre-defined period of time (staring from the time at which the switch was last closed) expires, when motion of the detachment mechanism is detected by the controller 206, and/or the energy integrator 230 determines that $E_{D-A}$ is greater than thr as mentioned above.

Memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The electro-mechanical lock mechanism 216 is operable to actuate the detachment mechanism 250. The detachment mechanism 250 can include a lock configured to move between a lock state and an unlock state. Such a lock can include, but is not limited to, a pin. The electro-mechanical lock mechanism 216 is shown as being coupled between switch 228 and Rx circuit 224. Components 224, 206 can cause the lock of the detachment mechanism 250 to be transitioned between states in accordance with information received from an external device (e.g., MCD 104 of FIG. 1).

The components 204-208, 224, 260 may be collectively referred to herein as the RF enabled device 136. The RF enabled device 136 can be incorporated into a device which also houses the electro-mechanical lock mechanism 216, or can be a separate device which is in direct or indirect communication with the electro-mechanical lock mechanism 216.

Illustrative Security Tag Architectures

Illustrative architectures for a security tag 300 will now be described in detail in relation to FIGS. 3-12. Security tag 132 of FIG. 1 can be the same as or similar to security tag 300. As such, the following discussion of security tag 300 is sufficient for understanding various features of security tag 132.

As shown in FIGS. 3-8, the security tag 300 comprises a hard EAS tag formed of a molded plastic enclosure 302. An EAS and/or RFID element (not shown in FIGS. 3-12) may be housed within the enclosure 302. The enclosure 302 is defined by first and second housing portions 304, 306 that are securely coupled to each other (e.g., via an adhesive, an ultrasonic weld and/or mechanical couplers 400 such as screws).

The enclosure 302 has an insert space 402 sized and shaped for receiving at least a portion of an article (e.g., article 102 of FIG. 1) so that the security tag 300 can be securely attached or coupled thereto. The security tag 300 is securely coupled to the article by transitioning a pin 308 from an unengaged state shown in FIG. 9 to an engaged state shown in FIGS. 3-9 and 11. The transitioning is achieved by moving the pin 308 out of a first section 310 of the enclosure 302, through the insert space 402, and into a second section 312 of the enclosure 302. A knob 314 is provided to allow a user to control said transitioning. The knob may be provided on a side surface of the enclosure 302 as shown in FIGS. 3-11 or alternatively on another surface (e.g., a top surface) of the enclosure as shown in FIG. 12. A mechanical mechanism (now shown in FIGS. 3-8) retains the pin 308 in its engaged state.

Figure 9:
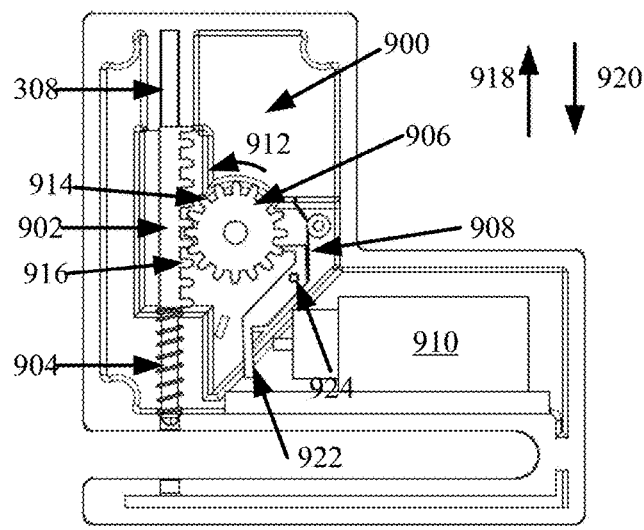
FIGS. 9-11 provide illustrations that are useful for understanding operations of various mechanical components disposed within the security tag shown in FIGS. 3-8.
Figure 10:
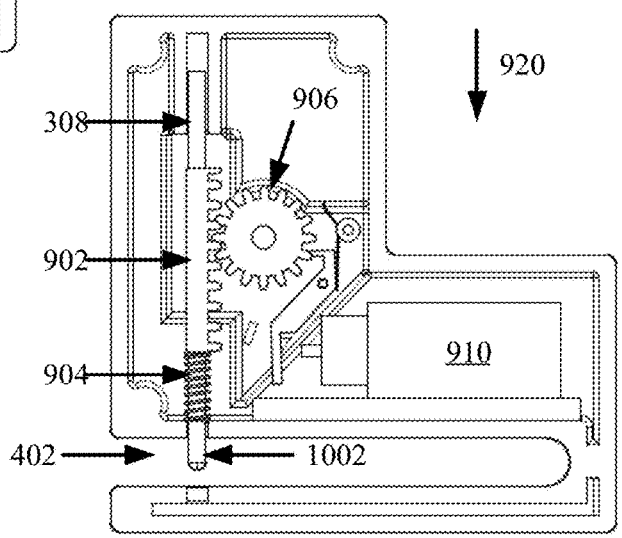
Figure 11:
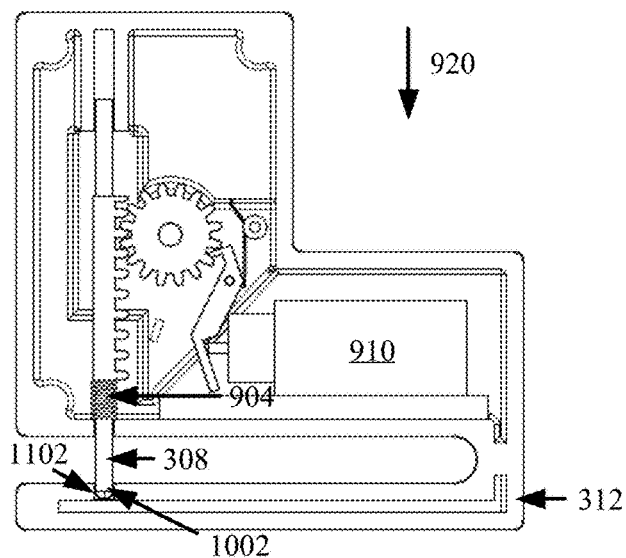
Figure 12:
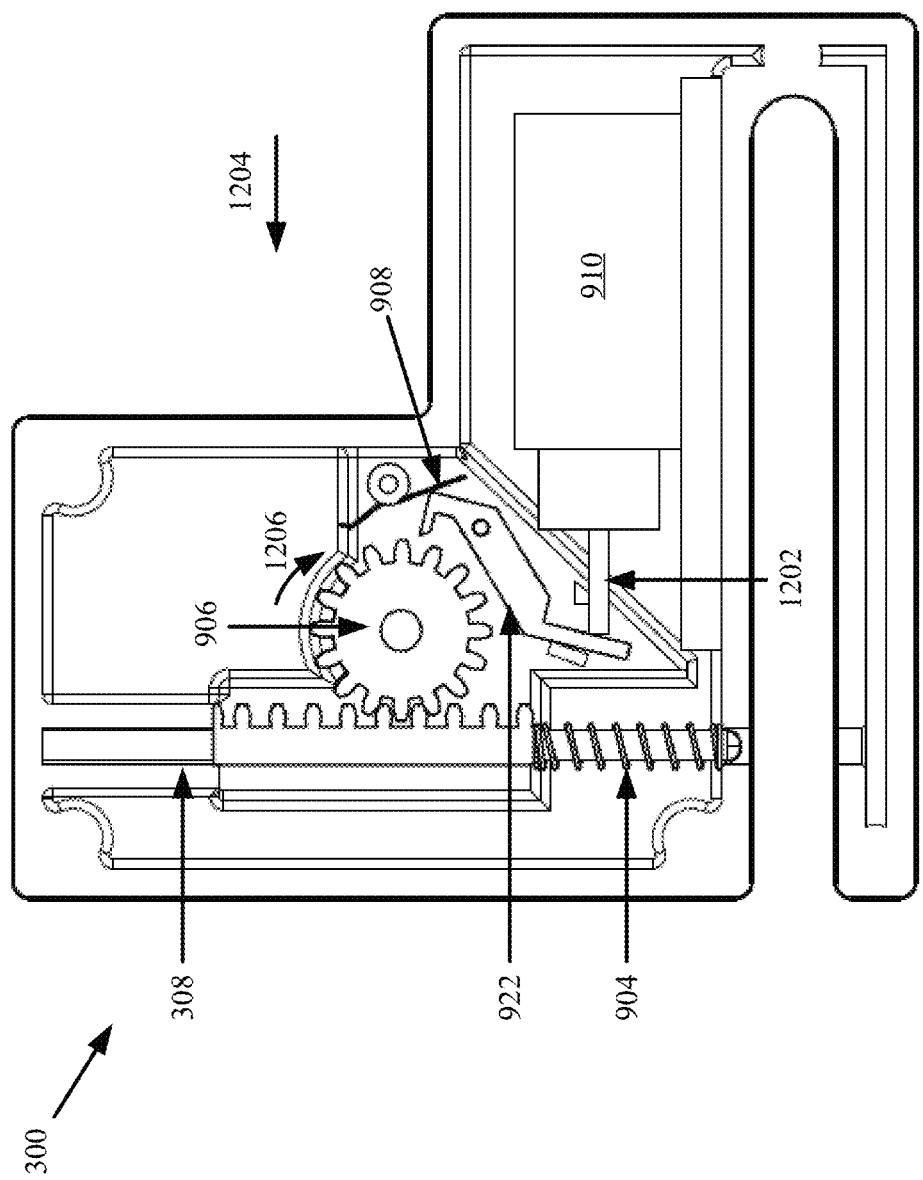
FIG. 12 is an illustration that is useful for understanding how a pawl of a security tag is released.

Referring now to FIGS. 9-11, the internal components of the security tag 300 will be described. As noted above, an EAS/RFID element, RF enabled device (e.g., RF enabled device 136 of FIGS. 1-2) and/or electro-mechanical lock mechanism (e.g., electro-mechanical lock mechanism 216 of FIG. 2) are disposed within the security tag 300. The EAS/RFID element and RF enabled device are not shown in FIGS. 9-11 exclusively for simplifying the illustrations thereof.

As shown in FIG. 9, the electro-mechanical lock mechanism 900 of the security tag 300 comprises the pin 308, a linear actuator 902, 906, a spring 904, a leaf spring 908, a pawl 922 and an electric solenoid 910. The electro-mechanical lock mechanism 900 is not limited to these components. For example, the electric solenoid 910 may be replaced with a gear motor. Electric solenoids and gear motors are well known in the art, and therefore will not be described herein. Any known or to be known electric solenoid and/or gear motor can be used herein without limitation, provided that the overall size thereof complies with the size requirements of the security tag 300.

The linear actuator comprises a pair of gears 902 and 906 which convert rotational motion of a circular gear 906 into linear motion of a linear gear 902. The circular gear 906 is referred to herein as a pinion gear, while the linear gear 902 is referred to herein as a rack gear. The knob 314 facilitates the user controlled rotational motion of the pinion gear 906. As such, the pinion gear 902 is coupled to the knob 314 such that it rotates therewith. For example, the pinion gear 902 rotates in the direction shown by arrow 912 as the knob 314 is rotated in said direction by a user.

The pinion gear 902 has a plurality of teeth 914 which engage a plurality of teeth 916 of the rack gear 902. Engagement of the teeth 914, 916 allows the rotational motion applied to the pinion gear 906 via the knob 314 to cause the rack gear 902 to move, thereby translating the rotational motion of the pinion gear 906 into the linear motion of the rack gear 902.

The rack gear 902 is securely coupled to the pin 308. Accordingly, linear motion of the rack gear 902 in direction 918 causes linear motion of the pin 308 in the same direction. Likewise, linear motion of the rack gear 902 in direction 920 causes linear motion of the pin 308 in the same direction. As the rack gear 902 moves in direction 920, the pin 308 transitions from its unengaged position shown in FIG. 9 to an intermediary position shown in FIG. 10.

In the intermediary position, an end 1002 of the pin 308 extends into the insert space 402. Also, the rack gear 902 applies a pushing force on the spring 904 which causes the compression thereof. In effect, the pin/gear arrangement is spring loaded, and wants to return to the unengaged position when the pin 208 is in its intermediary position (as well as when in its fully engaged position).

Figure 13:
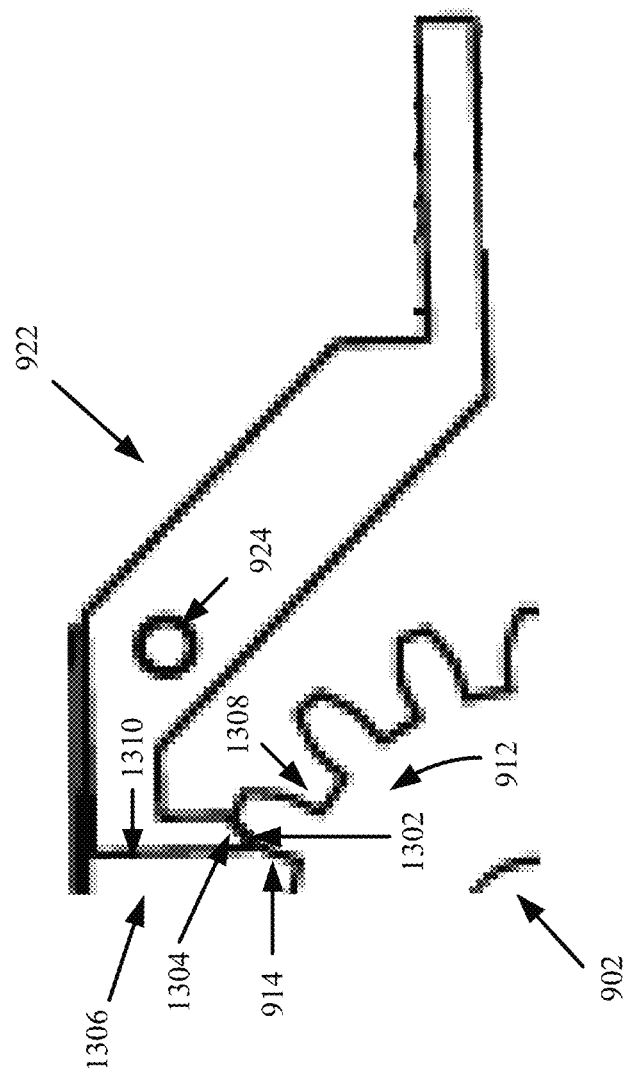
FIG. 13 is a top view of a pawl and a pinion gear.
Figure 14:
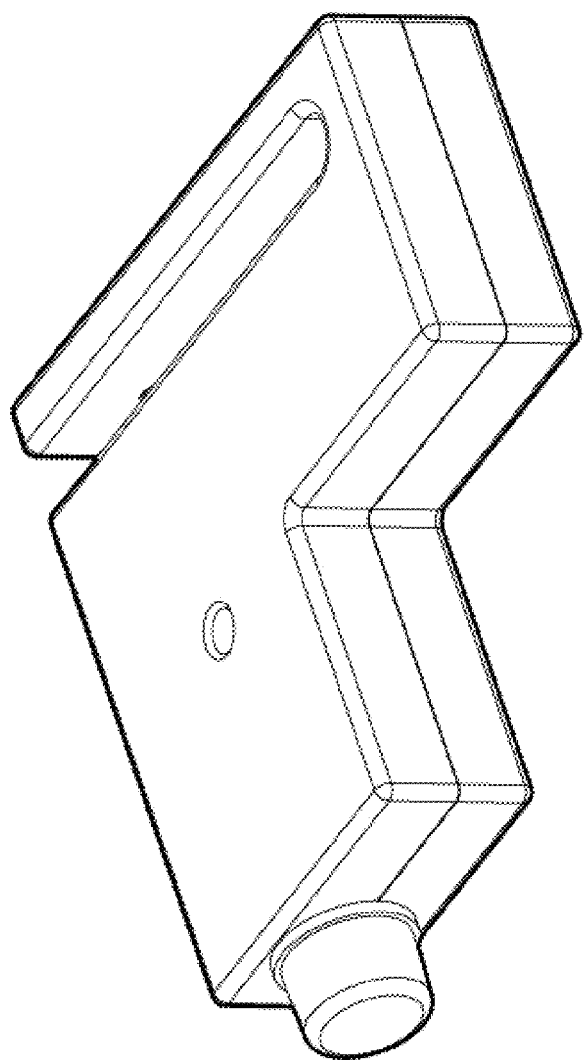
FIG. 14 is a perspective view of another illustrative security tag.

The pin 308 is retained in its intermediary position via the pawl 922. In this regard, the pawl 922 engages the pinion gear 902, and is pivotally coupled to the enclosure via a pivot member 924. An illustration is provided in FIG. 13 which is useful for understanding the mechanical relationship between these components 902, 922. As shown in FIG. 13, the pawl comprises a protrusion 1306 that slidingly engages the teeth 914 of the pinion gear 902. The sliding engagement is facilitated by chamfered surface 1304 of protrusion 1306 and chamfered surfaces 1302 of teeth 914. As the pinion gear 902 rotates in direction 912, the chamfered surface 1304 slides along the exterior surface of the pinion gear 902 at least partially defined by the chamfered surfaces 1302 of teeth 914. In effect, the pawl's protrusion 1306 travels into and out of spaces 1308 existing between adjacent teeth 914 of the pinion gear 902. The leaf spring 908 facilitates the protrusion's traveling back into the spaces 1308.

When the protrusion 1306 resides in a space 1308, the pin 308 is retained in a given position since the pawl 922 prevents rotation of the pinion gear in a direction opposite direction 912. The prevention of the pinion gear's rotation in the direction opposite direction 912 is at least partially facilitated by the straight surface 1310 of pawl 922 which engages the teeth 914 in a manner which does not allow the protrusion 1306 to travel into and out of spaces 1308 as a consequence of the pinion gear's traveling in the direction opposite direction 912.

Referring now to FIG. 11, there is provided an illustration of the pin 308 in its fully engaged position. As shown in FIG. 11, the end 1002 of the pin 308 extends into an aperture 1102 formed in the second section 312 of the enclosure 302. Also, the spring 904 is in its fully compressed state. In effect, the pin/gear arrangement is spring loaded, and wants to return to the unengaged position. Thus, the pin is retracted back into the first section 310 of the enclosure 302 when the pawl 922 is released which results in the spring's automatic transition from its compressed state to its natural uncompressed state. During this transition, the rack gear 902 is able to freely travel in direction 918.

Referring now to FIG. 12, there is provided an illustration that is useful for understanding how the pawl 922 is released. As noted above, detach operations of the security tag 300 are initiated via its reception of a wireless detach signal from an external device (e.g., MCD 104 and/or the RTS 118 of FIG. 1). Upon said reception, the security tag 300 authenticates the detach command and performs operations (e.g., closed switch 228 of FIG. 2) to cause activation of the detaching mechanism, namely electric solenoid 910. The electric solenoid 910 is activated by supplying power thereto (e.g., from an Rx circuit 224 of FIG. 2). The electric solenoid 910 drives post 1202 such that it moves in direction 1204 so as to apply a pushing force on the pawl 1204. The pushing force has a magnitude that is great enough to overcome a pushing force applied to the pawl 922 by leaf spring 908. The application of the pushing force by post 1202 causes the pawl 922 to transition from its engaged state shown in FIGS. 9-11 to its unengaged state shown in FIG. 12. In effect, the pinion gear 906 is able to move freely in direction 1206. Therefore, the pin 308 is able to be retracted from its engaged state as a result of the spring's 904 decompression. Once the pin 308 has been fully retracted, the security tag 300 may be removed from an article (e.g., article 102 of FIG. 1) to which it is attached. In this scenario, a customer (e.g., customer 140 of FIG. 1) can carry the article through a surveillance zone without setting off an alarm.

Another illustrative architecture for a security tag 1700 will now be described in detail in relation to FIG. 17. Security tag 132 of FIG. 1 can be the same as or similar to security tag 1700. As such, the following discussion of security tag 1700 is sufficient for understanding various features of security tag 132.

Figure 17:
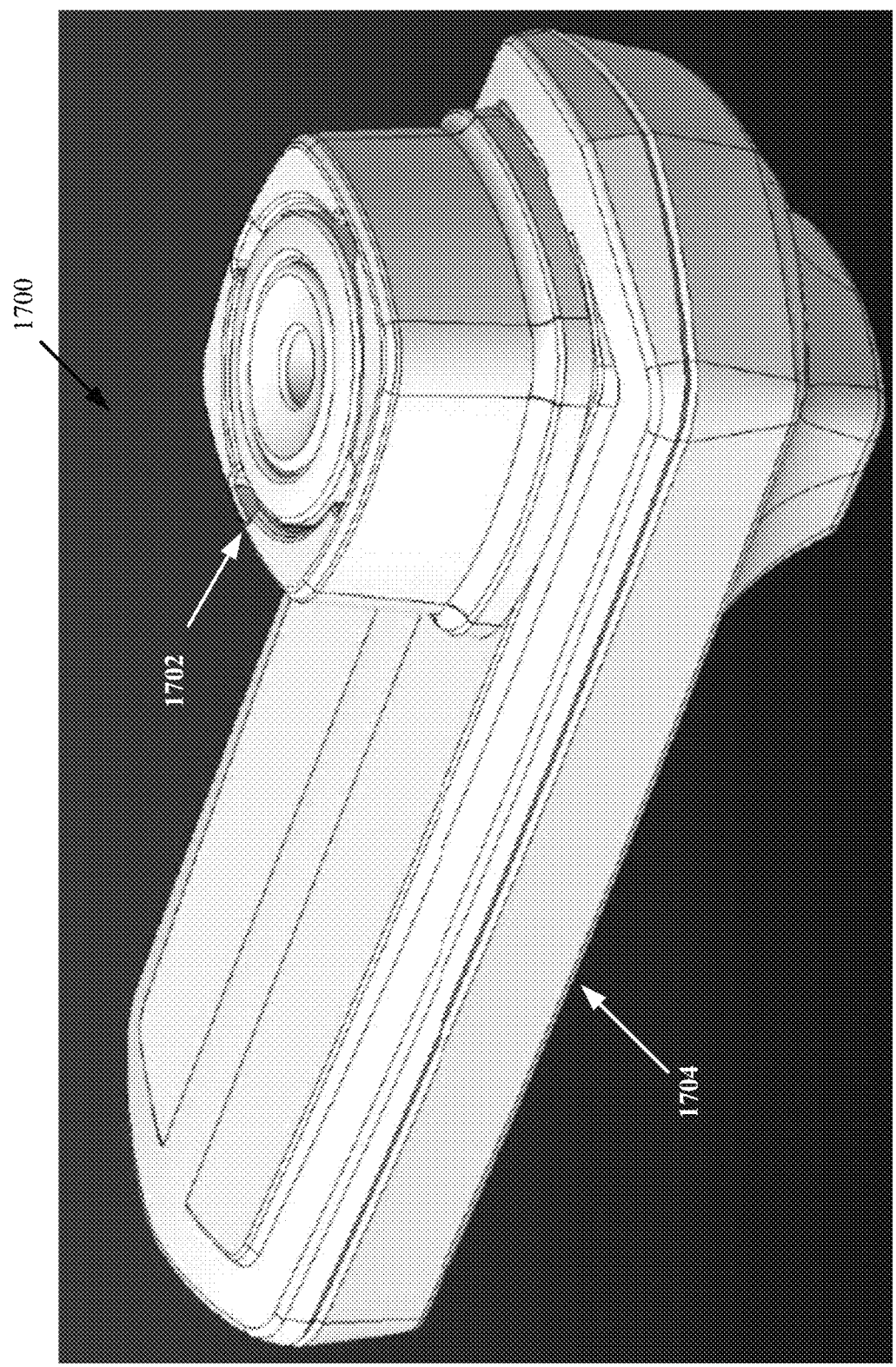
FIG. 17 provides an illustration of another illustrative architecture for a security tag.

The security tag 1700 comprises a removable pin 1702 which can be secured to the tag body via a securement mechanism (not visible in FIG. 17). Securement mechanisms are well known in the art. Any known or to be known securement mechanism can be used here. For example, a three ball clutch mechanism or a clamp can be employed as the securement mechanism.

The security tag 1700 also comprises an internal RF enabled device (not shown in FIG. 17) and an optional internal EAS component (not shown in FIG. 17). The RF enabled device can be the same as or similar to the RF enabled device 136 of FIGS. 1-2. The RF enabled device is designed to cause actuation of the securement mechanism for releasing the pin 1702 therefrom. EAS components are well known in the art, and therefore will not be described herein.

Figure 18:
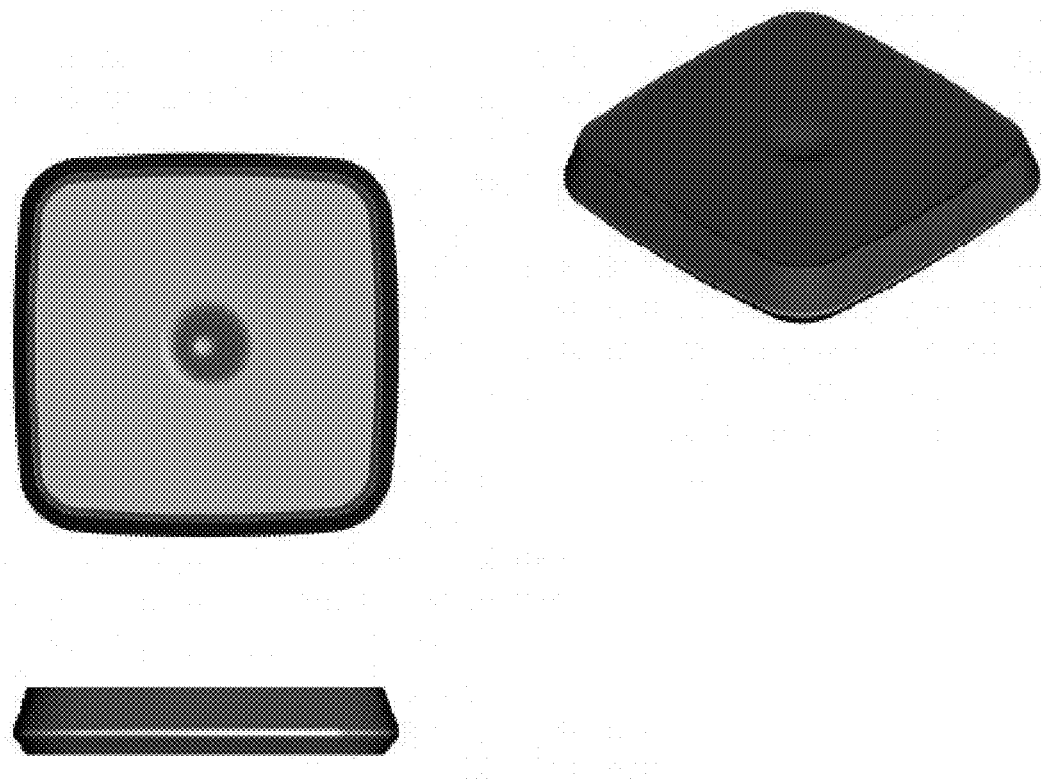
FIG. 18 provides an illustration of an illustrative pad that can be used with the security tag of FIG. 17 for selectively releasing a pin therefrom.

FIG. 18 provides an illustration of an illustrative pad 1800 that can be used with a security tag 132, 300, 1700 for selectively releasing the pin (e.g., pin 308 of FIG. 3 or 1702 of FIG. 17) therefrom as described herein. The pad 1800 includes an internal circuit (not shown) configured to generate and transmit signals at a given frequency (e.g., 90 kHz). The signals can include, but are not limited to, RF signals. Circuits for generating and transmitting signals are well known in the art, and therefore will not be described herein. Any known or to be known signal generating/transmitting circuit can be used here. In some scenarios, the internal circuit is the same as or similar to the RF transceiver 204 of FIG. 2. This given frequency can be the same as the frequency to which the Rx circuit (e.g., Rx circuit 224 of FIG. 2) of the security tag 1700 is tuned. The signal transmitted by the pad 1800 causes power to be supplied to a securement mechanism of the security tag, whereby the pin is released.

Figure 19:
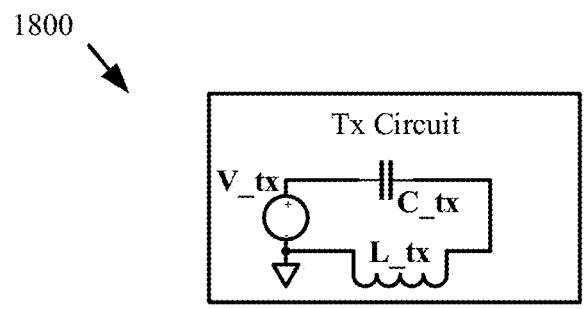
FIG. 19 provides an illustration of an illustrative transmit circuit for the pad of FIG. 18.

In some scenarios, the internal transmit circuit of the pad 1800 comprises a capacitor C_tx, an inductor L_tx connected to a first terminal of the capacitor C_tx, and a voltage source V_tx coupled a second terminal of the capacitor C_tx and tuned to a frequency of the capacitor C_tx and inductor L_tx, as shown in FIG. 19. The voltage is induced in the receive circuit (e.g., Rx circuit 224 of FIG. 2) of the security tag via resonant inductive coupling between the inductor L_tx of the pad's transmit circuit and the inductor (e.g., inductor L_rx of FIG. 2) of the receive circuit. The inductor in the receive circuit resonates with a receive capacitor (e.g., capacitor C_rx of FIG. 2) when the switch (e.g., switch 228 of FIG. 2) is closed. The receive capacitor is tuned to a frequency that is the same as a frequency to which the pad's transmit circuit is tuned. The mechanical component (e.g., electro-mechanical lock mechanism 216 of FIG. 2) of the security tag is connected directly between the switch and the capacitor of the receive circuit.

Illustrative Methods for Operating a Security Tag

Figure 15:
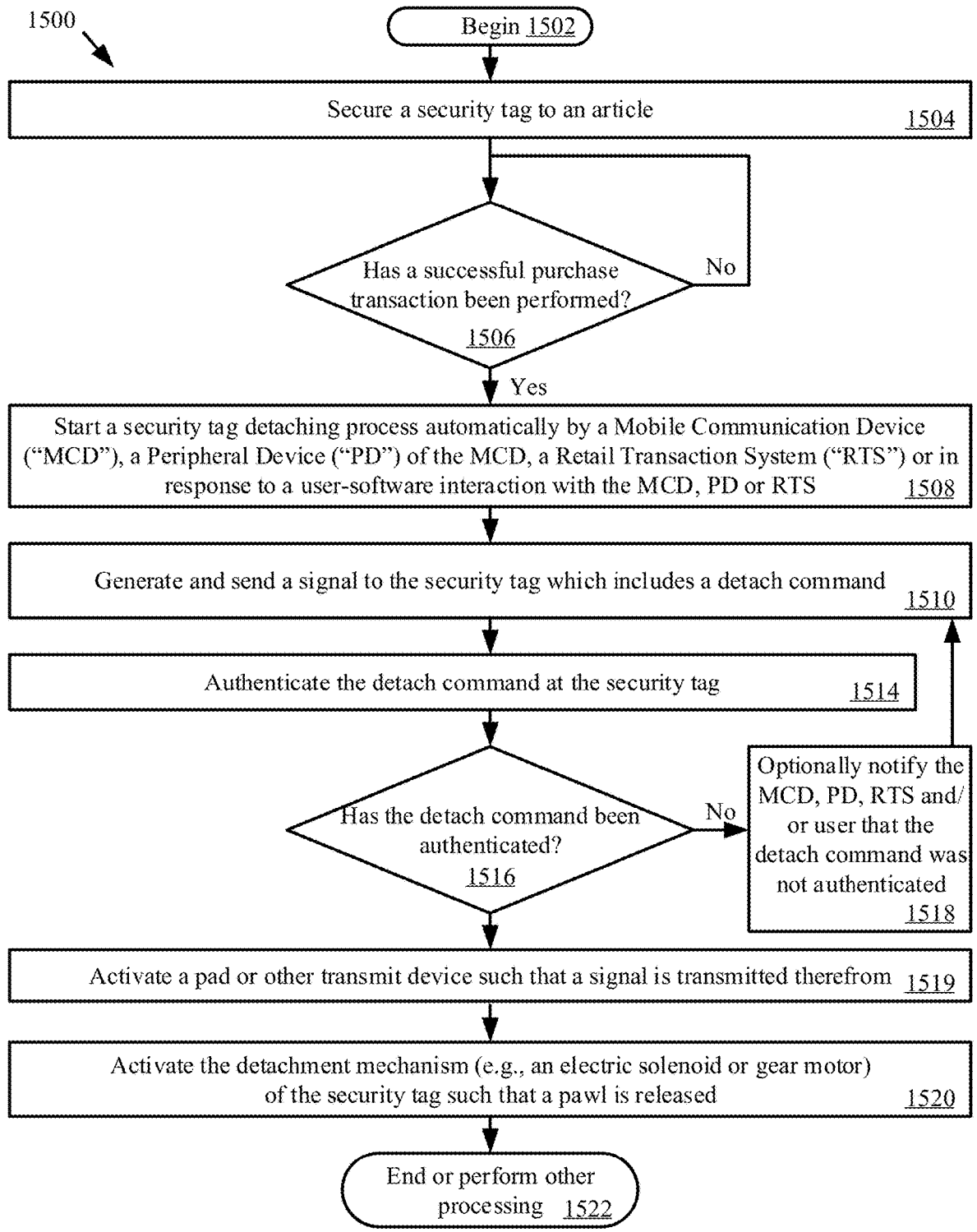
FIG. 15 is a flow chart of an illustrative method for operating a security tag.

Referring now to FIG. 15, there is provided a flow diagram of an illustrative method 1500 for operating a security tag. Method 1500 begins with 1502 and continues with 1504 where a security tag (e.g., security tag 132 of FIG. 1 or 300 of FIG. 3) is attached to an article (e.g., article 102 of FIG. 1). This attachment involves rotating a knob (e.g., knob 314 of FIG. 3) of the security tag so as to cause a pin (e.g., pin 308 of FIG. 3) to transition into an engaged position (shown in FIG. 11). The manner in which the pin transitions to its engaged position is described above in relation to FIGS. 9-11. Other techniques and mechanisms can be used in addition to or as an alternative to the knob based technique for attaching the security tag to an article.

Sometime thereafter, a decision is made in 1506 to determine if a purchase transaction has been successfully performed. If the purchase transaction was not successful [1506:NO], then method 1500 returns to 1504. In contrast, if the purchase transaction was successful [1506:YES], then 1508 is performed where a security tag detaching process is automatically begun by an MCD (e.g., MCD 104 of FIG. 1), an RTS (e.g., RTS 118 of FIG. 1) or in response to a user-software interaction with the MCD or RTS. The security tag detaching process involves the operations performed in 1510-1520. 1510-1520 involve: generating (e.g., by MCD 104 of FIG. 1) and sending a signal to the security tag which includes a detach command for actuating a detachment mechanism of the security tag; wirelessly receiving the signal at the security tag; and authenticating the detach command at the security tag.

If the detach command is not authenticated [1516:NO], then optional 1518 is performed where the MCD, RTS and/or user is(are) notified that the detach command was not authenticated by the security tag. Subsequently, method 1500 returns to 1510.

If the detach command is authenticated [1516:YES], then a pad (e.g., pad 1800 of FIG. 18) or other transmit device is activated such that a signal is generated and transmitted therefrom, as shown by 1519. In response to the signal, the detachment mechanism (e.g., electric solenoid 910 of FIG. 9) of the security tag is activated as shown by 1520. Such activation can be achieved simply by closing a switch (e.g., switch 228 of FIG. 2) internal to the security tag. As a consequence of closing the switch, energy is allowed to flow from a receive circuit (e.g., Rx circuit 224 of FIG. 2) of the security tag to the detachment mechanism so that a pawl (e.g., pawl 922 of FIG. 9) is released. The pawl's release can be achieved in the manner described above in relation to FIG. 12.

Figure 16:
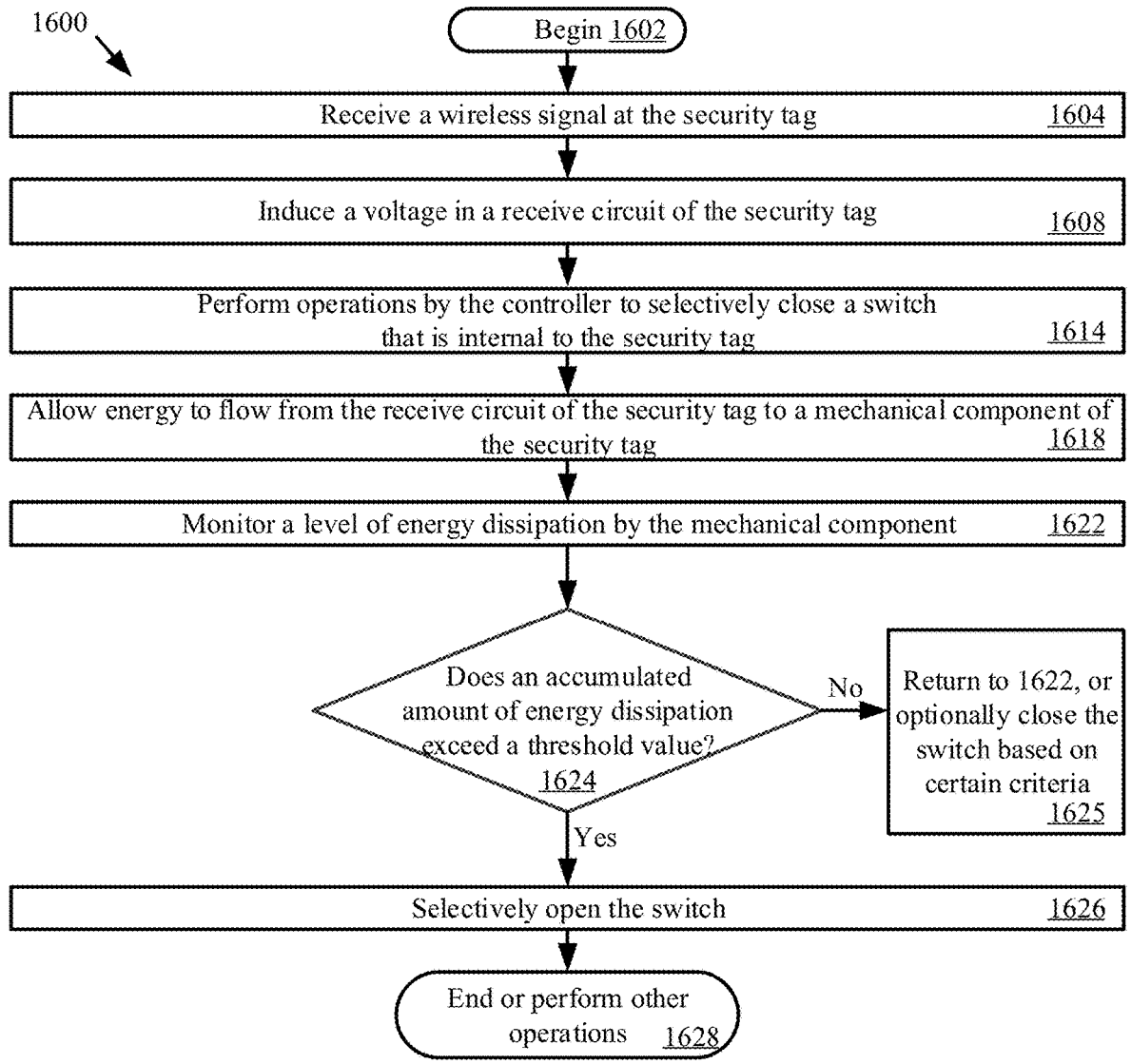
FIG. 16 is a flow chart of an illustrative method for operating a security tag.

Referring now to FIG. 16, there is provided a flow diagram of an illustrative method 1600 for operating a security tag (e.g., security tag 132 of FIGS. 1-2 and/or 300 of FIGS. 3-14). The method 1600 begins with 1602 and continues with 1604 where a wireless signal is received at the security tag using a receive circuit (e.g., receive circuit 224 of FIG. 2). This wireless signal may be generated by a pad (e.g., pad 1800 of FIG. 18) or other transmit device (e.g., MCD 104 of FIG. 1). This wireless signal causes a voltage to be induced in the receive circuit of the security tag as shown by 1608.

In 1614, the controller (e.g., controller 206 of FIG. 2) performs operations to selectively close a switch (e.g., switch 228 of FIG. 2) that is internal to the security tag. The switch can be selectively closed based on information contained in a signal received by an RF transceiver (e.g., RF transceiver 204 of FIG. 2) of the security tag. This information can include, but is not limited to, a detach command. When the switch is closed, energy is allowed to flow from the receive circuit of the security tag to a mechanical component (e.g., electro-mechanical lock mechanism 216 of FIG. 2) of the security tag. This flow of energy causes actuation of the mechanical component.

In some scenarios, the controller may optionally perform operations in 1614 to detect motion of the mechanical component and/or detect when a pre-determined period of time has expired. The pre-determined period of time may start at the time of switch closure. This information can be obtained by the controller for determining when to open the switch as described above.

Upon completing 1618, method 1600 continues with operations 1622-1626 to prevent damage to the mechanical component when the security tag is a certain distance from an external transmit device or circuit (e.g., MCD 104 of FIG. 1 and/or pad 1800 of FIG. 18). In 1622, the controller of the security tag monitors a level of energy dissipation by the mechanical component. In 1624, the controller determines if an accumulated amount of energy dissipation exceeds a threshold value. If the accumulated amount of energy dissipation does exceed the threshold value [1624:YES], then the controller performs operations to open the switch as shown by 1626. Subsequently, 1628 is performed where method 1600 ends or other operations are performed.

In contrast, if the accumulated amount of energy dissipation does not exceed the threshold value [1624:NO], then method 1600 returns to 1622 or optionally closes the switch based on some criteria, as shown by 1625. For example, the switch can be closed when motion of the mechanical component is detected or a pre-determined period of time expires. If the switch is closed in 1625, then method 1600 can end or other operations are performed.

In some scenarios, the release of the mechanical component is achieved by transitioning a pin (e.g., pin 308 of FIG. 3) from an engaged position to an unengaged position without any human assistance or mechanical assistance by a device external to the security tag. An end of the pin resides within an aperture formed in a first portion of an enclosure spaced apart from a second portion of the enclosure by a gap when the pin is in the engaged position, and the pin is fully retracted into the second portion of the enclosure when the pin is in the unengaged position.

In those or other scenarios, the transmit circuit of, for example, the pad comprises a capacitor, an inductor connected to a first terminal of the capacitor, and a voltage source coupled a second terminal of the capacitor and tuned to a frequency of the capacitor and inductor. The voltage is induced in the receive circuit of the security tag via resonant inductive coupling between the inductor of the external transmit circuit and the inductor (e.g., inductor L_rx of FIG. 2) of the receive circuit. The inductor in the receive circuit resonates with a capacitor (e.g., capacitor C_rx of FIG. 2) when the switch is closed. The capacitor of the receive circuit is tuned to a frequency that is the same as a frequency to which the external transmit circuit is tuned. The mechanical component of the security tag is connected directly between the switch and the capacitor of the receive circuit.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for operating a security tag, comprising:
   inducing a voltage in a receive circuit of a security tag via a first wireless signal;
   closing, by a controller of the tag, a switch thereby allowing energy to flow from the receive circuit to a mechanical component of the tag;
   determining, by the controller, when an accumulated amount of energy dissipation by the mechanical component from the flowing energy exceeds a threshold value; and
   opening, by the controller, the switch upon determining that the accumulated amount of energy dissipation by the mechanical component exceeds the threshold value.

2. The method according to claim 1, wherein the flow of energy is interrupted by opening the switch.

3. The method according to claim 1, wherein the threshold value represents an upper safe operational limit of the mechanical component.

4. The method according to claim 1, further comprising selectively opening the switch upon expiration of a pre-defined period of time starting from a time at which the switch was closed.

5. The method according to claim 1, further comprising selectively opening the switch when motion of the mechanical component is detected by the controller.

6. The method according to claim 1, wherein the opening causes transitioning of a pin of the mechanical component from an engaged position to an unengaged position without any human assistance or mechanical assistance by a device external to the security tag.

7. The method according to claim 1, wherein the voltage is induced in the receive circuit via resonant inductive coupling between an external transmit circuit and an inductor of the receive circuit.

8. The method according to claim 1, wherein an inductor in the receive circuit resonates with a capacitor when the switch is closed.

9. The method according to claim 8, wherein the capacitor is tuned to a frequency that is a frequency to which an external transmit circuit is tuned.

10. The method according to claim 1, wherein the mechanical component of the security tag is connected directly between the switch and a capacitor of the receive circuit.

11. The method according to claim 1, further comprising harvesting energy by the security tag when the switch is open.

12. The method according to claim 11, further comprising discontinuing energy harvesting by the security tag when the switch is closed.

13. A security tag, comprising:
- a receive circuit, operative to receive a first wireless signal and in response develop a voltage across the receive circuit;
- a switch connected in electrical series with a side of the receive circuit;
- an electro-mechanical lock electrically connected across the switch and the receive circuit;
- a controller operative to:
  - selectively open and close the switch, thereby controlling energy flow from the receive circuit to the electro-mechanical lock;
  - upon closing the switch determine when an accumulated amount of energy dissipation by the electro-mechanical lock from the flowing energy exceeds a threshold value; and
  - upon determining that the accumulated amount of energy dissipation by the electro-mechanical lock exceeds the threshold value, open the switch.

14. The security tag according to claim 13, wherein the flow of energy is interrupted by opening the switch.

15. The security tag according to claim 13, wherein the threshold value represents an upper safe operational limit of the electro-mechanical lock.

16. The security tag according to claim 13, wherein the switch is selectively opened upon expiration of a pre-defined period of time starting from a time at which the switch was closed.

17. The security tag according to claim 13, wherein the switch is selectively opened when motion of the electro-mechanical lock is detected.

18. The security tag according to claim 13, wherein the opening causes transitioning of a pin of the electro-mechanical lock from an engaged position to an unengaged position without any human assistance or mechanical assistance by a device external to the security tag.

19. The security tag according to claim 13, wherein the voltage is induced in the receive circuit via resonant inductive coupling between an external transmit circuit and an inductor of the receive circuit.

20. The security tag according to claim 13, wherein an inductor in the receive circuit resonates with a capacitor when the switch is closed.

21. The security tag according to claim 20, wherein the capacitor is tuned to a frequency to which an external transmit circuit is tuned.

22. The security tag according to claim 13, wherein the electro-mechanical lock is connected directly between the switch and a capacitor of the receive circuit.

23. The security tag according to claim 13, wherein the security tag harvests energy when the switch is open.

24. The security tag according to claim 23, wherein energy harvesting by the security tag is discontinued with the switch is closed.

* * * * *